Figure 1:
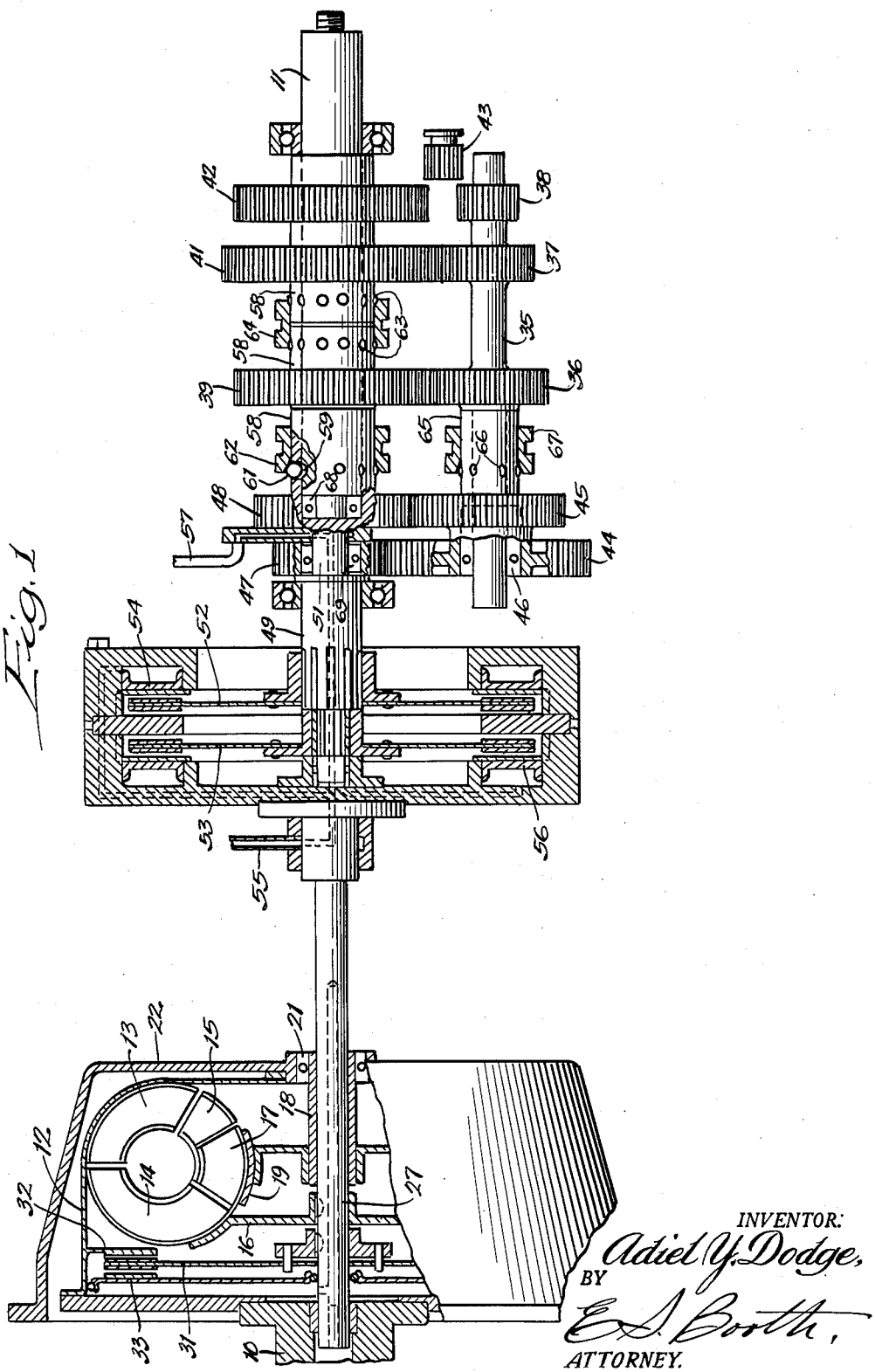

Nov. 8, 1955 A. Y. DODGE 2,722,844
TRANSMISSIONS
Filed Nov. 16, 1950 2 Sheets-Sheet 1

INVENTOR:
Adiel Y. Dodge,
BY
E. A. Borth,
ATTORNEY.

Nov. 8, 1955  A. Y. DODGE  2,722,844
TRANSMISSIONS
Filed Nov. 16, 1950  2 Sheets-Sheet 2
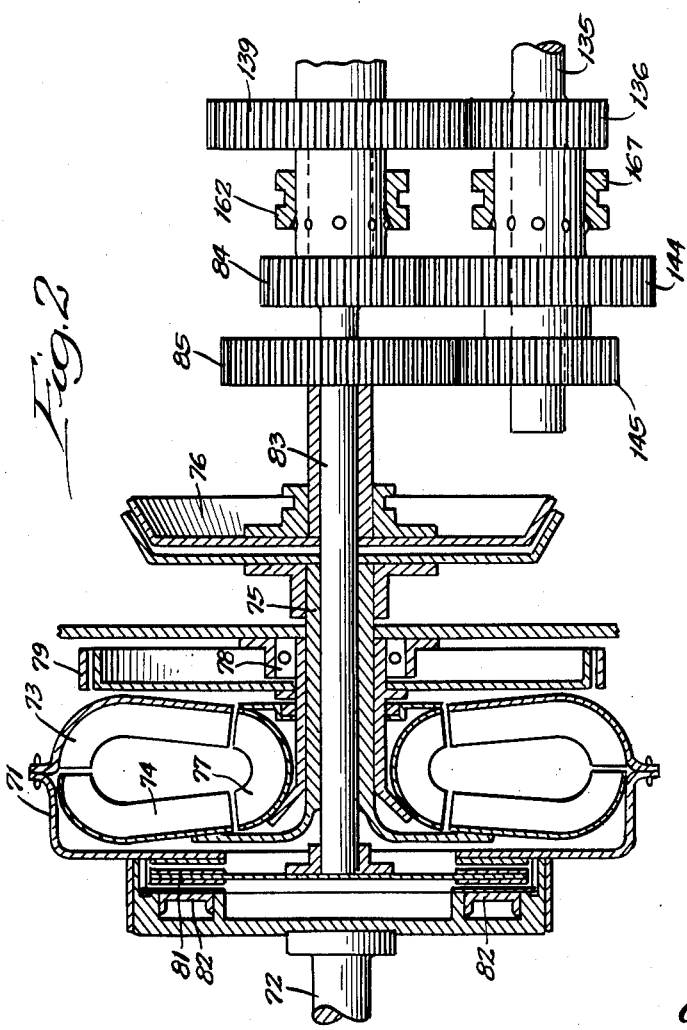
INVENTOR:
Adiel Y. Dodge,
BY
E. A. Borth,
ATTORNEY.

United States Patent Office 2,722,844
Patented Nov. 8, 1955

2,722,844

TRANSMISSIONS

Adiel Y. Dodge, Rockford, Ill.

Application November 16, 1950, Serial No. 196,026

7 Claims. (Cl. 74—330)

This invention relates to transmissions and more particularly to selective gear transmissions of the lay shaft or countershaft type.

Selective gear transmissions have been extensively used in which gear changes are effected by shifting either the gears themselves or clutches by which the gears are connected to the shafts. To shift transmissions of this type it is necessary to interrupt the torque as by disengaging a main clutch, to bring the gears to be engaged into synchronism, and then to shift either the gears or the clutches to establish the new ratio.

It is difficult to bring the gears into synchronism by adjusting engine speed and not only requires considerable skill on the part of the operator but also takes an appreciable amount of time, especially in the case of heavy vehicles such as trucks. Various auxiliary synchronizing devices have been used to assist in synchronizing the gears and these have been helpful but have not eliminated the necessity for torque interruptions and time delay in shifting. This is due in large part to the fact that meshed gears or conventional types of gear clutches cannot be disengaged under load.

It is accordingly one of the objects of the present invention to provide a transmission which can be shifted with a minimum of torque interruption.

Another object is to provide a transmission in which the gears are controlled by clutches which can easily be disengaged under full torque load.

Still another object is to provide a transmission including a pair of selectively effective input gears of different driving ratios which can be controlled simultaneously with the shifting to effect a synchronization of the gears to be engaged. According to one feature of the invention, complete synchronization is effected by one way clutches which may engage automatically when synchronization is reached.

According to another important feature of the invention, the difference in driving ratio between the two input gears is slightly greater than the ratio difference between successive steps in the transmission. In this way the shift in ratio in the transmission proper is always downward, which is easier to make than an upward shift and which enables complete synchronization to be obtained through one way clutches.

A further object is to provide a transmission in which changes in ratio can be cushioned and produced through a hydraulic torque transmitting device.

The above and other objects and advantages of the invention will be more readily apparent when read in connection with the accompanying drawing in which:

Figure 1 is a sectional view with parts in elevation of a transmission embodying the invention, and Figure 2 is a partial view similar to Figure 1 of an alternative construction.

As shown in Figure 1, the transmission is adapted to connect a driving shaft 10, which may be a crank shaft of an internal combustion engine to a driven or output shaft 11, which may be connected to the vehicle wheels through the usual differential mechanism. In the form shown in Figure 1, increasing speed ratio changes are accomplished through a hydraulic torque transmitting device including an outer casing 12 secured to the driving shaft 10 and carrying a set of driving vanes 13. The unit includes a driven rotor having two sets of connected vanes 14 and 15 which are connected through a flange 16 to an intermediate shaft 27.

Between the sets of vanes 14 and 15, a set of stator vanes 17 is arranged, carried by a rotatable sleeve 18. The stator is adapted to be held against reverse rotation by a one way brake 21 engaging the sleeve 18 and a part on a fixed housing 22.

The torque converter can be locked out of the circuit when desired for straight mechanical drive by means of a friction clutch including a disc 31 drivably connected to the shaft 27 and engageable with a flange 32 on the housing 12. A piston disc 33 is slidable in the housing to press the disc 31 against the flange 32 when direct mechanical drive is desired. Fluid may be admitted behind the disc 33 through a passage 34 in the housing communicating with a bore in the shaft 27 to engage the clutch under either mechanical or automatic control when desired.

It is to be understood that the hydraulic torque converter could be omitted if desired and the illustrated intermediate shaft 27 could be the engine crank shaft or an extension thereof.

The intermediate shaft 27 is adapted to drive the output shaft 11 through a selective gear transmission capable of selecting any desired one of several different torque ratios. As shown, the gear transmission comprises a lay shaft or countershaft 35 carrying gears 36, 37, and 38 of different sizes. The gear 36 meshes with a gear 39 rotatable on the output shaft 11 and the gear 37 similarly meshes with a gear 41 rotatable on the output shaft. The gear 38 is adapted to be connected with a gear 42 on the output shaft through a shiftable idler pinion 43 to obtain mechanical reverse.

The countershaft is adapted to be driven by either of a pair of gears 44 and 45 which are connected together and rotatably mounted on the countershaft. A one way clutch 46 is provided between the gears 44 and 45 and the countershaft to connect the gears to the countershaft when the gears tend to over-run the countershaft in their normal forward direction of rotation.

The gears 44 and 45 mesh respectively with a pair of input gears 47 and 48 which are rotatable relative to both the driven and intermediate shafts. The gear 47 is carried by a sleeve 49 which is rotatable on a shaft 51 carrying the gear 48. The sleeve 49 and shaft 51 may be selectively connected to the intermediate shaft 27 through friction clutches 52 and 53. As shown, the clutch 52 is engaged by an annular piston 54 supplied with operating fluid through passages in the clutch housing from a supply pipe 55 around the intermediate shaft. The clutch 53 is similarly engaged by an annular piston 56 supplied with operating fluid through a bore in the shaft 51 from a supply pipe 57. It will be understood that the supply of fluid to the clutches to engage them is controlled through suitable valves to effect the shifting operations as described hereinafter.

The gears 48, 39 and 41 are adapted to be connected to the driven shaft 11 through clutch devices which are constructed to release even under full torque load. The clutch devices may be of any desired type to accomplish, as, for example, shown in my copending application S. N. 213,141, filed February 28, 1951, or as more particularly described and claimed in my Patent No. 2,498,399, and may function in the manner fully set forth therein. Although the clutches are shown in the form covered in my patent for purposes of simplifying the diagrammatic disclosure and although such clutches will function satisfactorily, clutches as disclosed and claimed in my copending application are preferable since they provide much greater surface contact thereby providing longer life. As shown, each of the gears is formed with a tubular hub 58 fitting rotatably over the driven shaft and which is formed with a series of radially extending openings therethrough. The driven shaft is formed with recesses 59 registering with the openings and coupling balls 61 are slidable in the openings to engage with the recesses and connect the gears to the shafts.

Connection of the gear 48 to the shaft is controlled by a shiftable collar 62 formed at one end with an internal curved cammed surface so that when the collar is slid to the left, the coupling balls will be forced inward into the recesses to connect the gear 48 to the output shaft 11. The gears 39 and 41 are connected to the output shaft selectively by similar clutch mechanism including coupling balls 63 extending through openings in the gear hubs 58. A shiftable collar 64 is slidable over the two hubs 58 and is formed with cammed surfaces at each end. When the collar is in the central position as shown both clutches are released to disconnect both gears 39 and 41 from the shaft. When the collar 64 is shifted to the left, it will connect the gear 39 to the shaft and when it is shifted to the right, it will connect the gear 41 to the shaft.

The gears 44 and 45 may be connected to the lay shaft 35 so that torque will be transmitted in both directions through a hub 65 rigidly secured to the gears and having openings receiving coupling balls 66. A shiftable collar 67 formed with an internal cammed surface at one end may be shifted toward the gears to cam the coupling balls into recesses in the lay shaft.

To prevent over-running of the driven shaft in the event all of the clutches are disengaged, a one way clutch 68 is provided between the driven shaft and the gear 48 and a similar one way clutch 69 is provided between the gear 47 and the shaft 51. The clutches 68 and 69 are positioned to engage in the event the driven shaft tends to turn forward faster than the gears 47 and 48 so that the driven shaft will be connected through the one way clutches and through one or both of the clutches 52 and 53 to the intermediate shaft.

Due to the difference in size of the gears 47 and 48 and their meshing gears 44 and 45, the lay shaft and the output shaft will be driven at a lower speed ratio when the gear 47 is the driving gear than when the gear 48 is the driving gear. To start the vehicle, the clutch 52 is engaged to connect the gear 47 to the intermediate shaft 27 so that torque will be transmitted through the hydraulic unit through the gear 47. At the same time, the collar 64 is shifted to the right to connect the gear 41 to the output shafts. Under these conditions, maximum torque will be developed through the torque converter and the gear reduction effected by gears 47, 44, 37 and 41 to drive the output shaft at low speed and high torque. If it is desired to remain in this low ratio, the clutch 31 may be engaged to provide a mechanical connection from the crank shaft 10 the output shaft.

For shifting to the next higher ratio, the clutch 52 is disengaged and the clutch 53 is engaged to drive the gear 48. Preferably the clutch 31 is disengaged at this time so that the hydraulic unit will pick up the increased load. After the hydraulic unit reaches a direct drive condition or after the clutch 31 is reengaged, the transmission will be driven at a lower torque and higher speed ratio through the gears 48 and 45 and the gears 37 and 41.

To complete the higher ratio change the clutch 53 is disengaged and clutch 52 is engaged and collar 64 is simultaneously shifted to the left to connect the gear 39 to the output shaft. Preferably the ratio difference between gears 47 and 44 is approximately the same as or slightly greater than that between gears 48 and 45 so that the output shaft tends to turn faster than it would be driven through the gear 47. At this time, the one way clutch 46 may over-run until the engine speed increases or the vehicle speed decreases to the point where they are synchronized. Thereafter the output shaft will be driven through the gears 47 and 44 and the gears 36 and 39 at a higher speed and lower torque ratio.

To shift into the next higher ratio, the same process is repeated, first engaging clutch 53 and disengaging clutch 52 until the output shaft has been brought up to the increased speed. Thereafter the clutches 52 and 53 may again be reversed, the collar 64 may be shifted to its central position, and the collar 62 may be shifted to the left. At this time, the drive will be from gear 47 to gear 44 and from gear 45 to gear 48 which is connected to the output shaft. For direct drive, it is necessary only to disengage the clutch 52 and engage the clutch 53.

To shift down, the process as above described may be reversed, although it is possible easily to shift down without manipulating the clutches 52 and 53. The down shift can be accomplished either with the clutch 31 engaged for mechanical drive or disengaged for hydraulic drive as desired. In either case, since the ball type clutches can be disengaged under full load, the clutch which is transmitting torque can be easily disengaged and the clutch corresponding to the next lower ratio can be engaged. As long as the collar 67 is shifted to the right as shown, there will be no load on the clutch which is being engaged until synchronism is reached and the one way clutch 46 picks up the load. Shifting can therefore be accomplished very easily.

For engine braking in descending grades and the like, the collar 67 is shifted to the left to connect the gears 44 and 45 to the countershaft so that torque will be transmitted from the driven shaft through the gear transmission through the intermediate shaft 27. The clutch collars are preferably shifted through resilient yokes or the like so that the shift mechanism can be moved to the desired position even though the clutches are out of synchronism and cannot immediately engage. The spring mechanism will maintain a pressure on the collars so that as soon as the elements to be connected approach synchronism, the clutches will immediately move into engagement. This is particularly important in connection with the clutch 66, since the one way clutch 46 may hold its parts in a position in which they cannot engage. However, upon the first minor relative movement between the hub 65 and the countershaft, the clutch will immediately engage. With the type of clutch employed as described, locking of the clutch due to engagement under load and to maintenance of the load by the one way clutch 46 will be prevented so that the gears 44 and 45 can easily be disconnected from the countershaft at any time it is desired.

Figure 2 illustrates a transmission functioning on the same general principles as that of Figure 1, but which is somewhat simplified. This transmission as shown, comprises a hydraulic torque converter including a driving casing 71 which is connected to the driving shaft 72 and carries a series of impeller vanes 73. A driven rotor 74 in the casing is connected through a sleeve 75 to a mechanical friction clutch 76. A stator 77 is provided in the torque converter which is held against reverse rotation by a one way brake 78 and which may be held against forward rotation by a friction brake 79.

A mechanical friction clutch 81 is mounted in the casing 71 and may be engaged by an annular piston 82 to connect the driving shaft directly to an intermediate shaft 83. The intermediate shaft 83 carries a small driving pinion 84 for the selective gear transmission, the pinion 84 corresponding to the pinion 47 of Figure 1. The clutch 76 is connected to a larger driving pinion 85 which corresponds to the large driving pinion 48 of Figure 1. The selective gear transmission is shown only in part, the parts corresponding to like parts in Figure 1 being indicated by the same reference numerals plus 100.

This transmission functions in substantially the same manner as that of Figure 1, the clutches 81 and 76 corresponding exactly in their functions to the clutches 52 and 53 of Figure 1. When the clutch 81 is engaged, the torque flows directly from the driving shaft through this clutch to the small driving pinion 84 corresponding to the situation when the clutches 31 and 52 of Figure 1 are engaged. When the clutch 76 is engaged, and clutch 81 is disengaged, the drive is through the hydraulic torque converter and the clutch 76 to the large driving gear 85. This corresponds exactly to the condition when the clutch 31 of Figure 1 is disengaged and the clutch 53 is engaged. Therefore in the transmission of Figure 2, torque ratio, up shift changes may always be effected through the torque converter so that the hydraulic cushioning and torque multiplying effect of the converter are utilized.

In the neutral position of this transmission, both of the friction clutches 76 and 81 are disengaged and the several transmission clutches such as 162 and 167 are also disengaged. For first speed the low speed gear (41 in Figure 1) is clutched to the driven shaft and either of the clutches 76 or 81 may be engaged. If clutch 81 is engaged a low speed, high torque mechanical drive is produced through the gears 84 and 144 and the low speed gears 37 and 41. If the clutch 76 is engaged, the drive is through the torque converter and gears 85 and 145 and the low speed gears. Even though the gears 85 and 145 provide a lower torque ratio than the gears 84 and 144, this ratio is multiplied by the ratio produced in the torque converter so that the overall ratio may be higher. For this reason plus the smooth pickup produced by the hydraulic unit, it is preferred to start the vehicle by engaging the clutch 76.

For second speed, the second speed gear 39 is clutched to the output shaft and simultaneously the clutch 81 is engaged and the clutch 76 is disengaged. At this time the drive is through gears 84 and 144 and the intermediate gears 36 and 39. The difference in ratio between gears 85 and 84 is approximately equal to or perhaps slightly greater than that between gears 41 and 39 so that this change can be made easily and quickly with minimum interruption of torque.

For third speed the clutch 81 is disengaged and the clutch 76 is engaged. At this time the torque converter will pick up the drive through the gears 85 and 145 and the intermediate gears 36 and 39. As the torque converter comes up to a one to one ratio the speed of the output shaft will be smoothly increased relative to the engine speed.

For fourth speed the intermediate gear 39 is disconnected from the output shaft, the collar 162 is shifted to connect the gear 84 to the output shaft, the clutch 76 is disengaged, and the clutch 81 is engaged. This position produces a direct mechanical drive and the change can be made easily and without shock due to the fact that the output shaft is already turning at approximately the same or perhaps slightly greater speed than the driving shaft.

For fifth or overdrive speed the clutch 81 is disengaged and the clutch 76 is engaged. At this time the gear 85 is driven through the torque converter and tends to drive gear 84 faster than the input shaft.

It will be understood that in all of the changes involving connecting gears to the output shaft, the gear clutches may not engage immediately. If the clutch parts are out of register the shift may involve only applying a spring force to the corresponding clutch collar so that the clutch parts can actually move into engagement when they come into register at approximate synchronism.

For shifting down the steps described above may be reversed or, if desired, alternate steps may be omitted. This can easily be done since, as pointed out above, downshifts can be accomplished far more easily and quickly than normal upshifts.

While two embodiments of the invention have been shown and described in detail herein, it will be understood that this is illustrative only and is not to be taken as a definition of the scope of the invention, reference being had for this purpose to the appended claims.

What is claimed is:

1. A transmission comprising a driving member, a driven shaft, a countershaft parallel to to the driven shaft, intermeshing pairs of gears on the respective shafts, shiftable means to make the gears selectively effective to drive the driven shaft from the countershaft, a pair of gears of different sizes rotatably mounted on the countershaft, a one way clutch connecting the last named pair of gears to the countershaft to prevent the gears from turning faster than the countershaft in the normal forward direction, a pair of driving gears meshing with the last named pair of gears respectively, and a pair of selectively operable clutches to connect the driving gears to the driving member.

2. A transmission comprising a driving member, a driven shaft, a countershaft parallel to the driven shaft, intermeshing pairs of gears on the respective shafts, shiftable means to make the gears selectively effective to drive the driven shaft from the countershaft, a pair of gears of different sizes on the countershaft, a pair of driving gears meshing respectively with the last named pair of gears, a pair of selectively operable clutches to connect the driving gears to the driving member, and one way clutch means connecting the driven shaft to the driving gears to prevent the driven shaft from turning forward faster than the driving gears.

3. A transmission comprising a driving member, a driven shaft, a countershaft parallel to the driven shaft, intermeshing pairs of gears on the respective shafts, shiftable means to make the gears selectively effective to drive the driven shaft from the countershaft, a pair of gears of different sizes rotatably mounted on the countershaft, a one way clutch connecting the last named pair of gears to the countershaft to prevent the gears from turning faster than the countershaft in the normal forward direction, clutch elements on the last named pair of gears and the countershaft to connect them together and formed with angular engaging surfaces tending to disengage under load, means including a shiftable cam collar to hold the elements in engagement, a pair of driving gears meshing with the last named pair of gears respectively and a pair of selectively operable clutches to connect the driving gears to the driving member.

4. A transmission comprising a driving member, a driven shaft, a countershaft parallel to the driven shaft, intermeshing pairs of gears on the respective shafts, shiftable means to make the gears selectively effective to drive the driven shaft from the countershaft, a pair of gears of different sizes rotatably mounted on the countershaft, a one way clutch connecting the last named pair of gears to the countershaft to prevent the gears from turning faster than the countershaft in the normal forward direction, clutch elements on the last named pair of gears and the countershaft to connect them together and formed with angular engaging surfaces tending to disengage under load, means includig a shiftable cam collar to hold the elements in engagement, a pair of driving gears meshing with the last named pair of gears respectively, a pair of selectively operable clutches to connect the driving gears to the driving member, and one way clutches connecting the driven shaft to the driving gears to prevent the driven shaft from turning forward faster than the driving gears.

5. A transmission comprising a hydraulic torque transmitting device having a driving member and a driven member, a driven shaft, a countershaft parallel to the driven shaft, intermeshing pairs of gears on the shafts, the gears on one of the shafts being rotatable relative thereto, clutch elements on the last named gears and the corresponding shaft to connect the gears to the shaft, the clutch elements being formed with angular engaging surfaces tending to disengage under load, means including shiftable cam collars to hold the clutch elements in engagement, a pair of driving gears of different sizes on the countershaft, a pair of input gears meshing with the driving gears, respectively, and clutches for selectively operatively connecting the input gears to the driving and driven members the gears being of such relative sizes that substantially the same ratio will be provided by one pair of input and driving gears and one of the gears on the shaft as by the other pair of input and driving gears and another of the gears on the shaft.

6. A transmission comprising a gear set including shiftable means to establish different driving ratios in the gear set, a pair of driving gears of different sizes for the gear set, a pair of input gears permanently in mesh with the driving gears, a pair of clutches to connect the input gears selectively to a source of power, a shaft on which the driving gears are rotatably mounted, and a one way clutch to prevent the driving gears from turning faster than the shaft in the normal forward direction whereby in reducing speed ratios the shaft can overrun the driving gears until the one way clutch picks up the shaft.

7. A transmission comprising a driving member, a driven shaft, a countershaft parallel to the driven shaft, intermeshing pairs of gears on the respective shafts, shiftable means to make the gears selectively effective to drive the driven shaft from the countershaft, a pair of input gears of different sizes rotatably mounted on the countershaft, a pair of driving gears meshing with the last named pair of gears respectively, the gears being of such relative sizes that substantially the same ratio will be provided by one pair of input and driving gears and one pair of gears on the shafts as by the other pair of input and driving gears and another pair of gears on the shaft, clutch elements on the input gears and the countershaft to connect them together and formed with angular engaging surfaces tending to disengage under load, means including a shiftable cam collar to hold the elements in engagement, and means including a pair of selectively operable friction clutches to connect the driving gears selectively to the driving member to provide slipping means to change from one torque ratio to another without interrupting torque.

References Cited in the file of this patent

UNITED STATES PATENTS

| | | |
|---|---|---|
| 2,226,802 | Black | Dec. 31, 1940 |
| 2,344,656 | Swennes | Nov. 21, 1944 |
| 2,355,709 | Dodge | Aug. 15, 1944 |
| 2,403,378 | Kilpela | July 2, 1946 |
| 2,466,318 | Kohr | Apr. 5, 1949 |
| 2,498,399 | Dodge | Feb. 21, 1950 |
| 2,534,134 | Kirkpatrick | Dec. 12, 1950 |
| 2,543,412 | Kegresse | Feb. 27, 1951 |

FOREIGN PATENTS

| | | |
|---|---|---|
| 337,664 | Italy | Nov. 10, 1935 |
| 711,220 | Germany | Aug. 28, 1941 |